United States Patent [19]

Shepherd, Jr.

[11] 4,002,691
[45] Jan. 11, 1977

[54] POLYCYCLIC COMPOUNDS
[75] Inventor: Lawrence H. Shepherd, Jr., Baton Rouge, La.
[73] Assignee: Ethyl Corporation, Richmond, Va.
[22] Filed: Aug. 22, 1975
[21] Appl. No.: 606,762

Related U.S. Application Data

[60] Division of Ser. No. 401,210, Sept. 27, 1973, which is a continuation-in-part of Ser. No. 291,647, Sept. 25, 1972, Pat. No. 3,810,949, which is a continuation-in-part of Ser. No. 888,071, Dec. 24, 1969, abandoned.

[52] U.S. Cl. .......................... 260/617 F; 260/665 G; 260/488 B; 252/46.6; 252/400 A; 252/331; 252/498; 252/426; 252/8.6; 52/517; 424/343
[51] Int. Cl.$^2$ .......................................... C07C 35/00
[58] Field of Search ................................ 260/617 F

[56] References Cited
UNITED STATES PATENTS

| 2,940,984 | 6/1960 | Applequist et al. | 260/514 G |
| 3,410,912 | 11/1968 | Bruson et al. | 260/617 F |
| 3,907,908 | 9/1975 | Light et al. | 260/617 F |
| 3,914,322 | 10/1976 | Chappell et al. | 260/617 F |

OTHER PUBLICATIONS

Sauers et al., J. Org. Chem., vol. 33, No. 6, pp. 2175–2181, (1968).

Primary Examiner—James O. Thomas, Jr.
Assistant Examiner—James H. Reamer
Attorney, Agent, or Firm—Donald L. Johnson; John F. Sieberth

[57] ABSTRACT

Tricyclo[4.2.1.0$^{2,5}$]non-7-enes wherein the 3 position is substituted by a methylol group may be made by reacting a bicyclo[2.2.1]hepta-2,5-diene with a 2-alkenyl magnesium compound in a 1:1 ratio to yield a molecular addition product which is then oxidized and hydrolyzed to give the 3-methylol product. These substituted tricyclo[4.2.1.0$^{2,5}$]non-7-enes are useful, inter alia, as intermediates for the manufacture of lubricating oil additives and various other useful products and they may be used for gas scrubbing applications and the like.

1 Claim, No Drawings

POLYCYCLIC COMPOUNDS

REFERENCE TO RELATED APPLICATIONS

This application is a division of co-pending application Ser. No. 401,210, filed Sept. 27, 1973, which is a continuation-in-part of application Ser. No. 291,647, filed Sept. 25, 1972, now U.S. Pat. No. 3,810,949, which in turn is a continuation-in-part of application Ser. No. 888,071, filed Dec. 24, 1969 and now abandoned. The entire disclosure of said application Ser. No. 291,647 (U.S. Pat. No. 3,810,949) is incorporated herein as if fully set forth in this specification.

SUMMARY AND DESCRIPTION OF THE INVENTION

This invention relates to and provides tricyclo-[4.2.1.0$^{2,5}$]non-7-enes having a carbon bonded substituent in the 3 position, viz., a methylol group. In these compounds the methylol group can be esterified.

The compounds of this invention may be made by reacting a bicyclo[2.2.1]hepta-2,5-diene hydrocarbon compound with a 2-alkenyl magnesium compound co-reactive therewith in a 1:1 ratio to yield an intermolecular addition product such as tricyclo-[4.2.1.0$^{2,5}$]non-7-en-3-yl-methylmagnesium bromide. The tricyclo[4.2.1.0$^{2,5}$]non-7-enes in which there is a methylol group in the 3 position can be made by subjecting the foregoing addition product to oxidation (e.g., with oxygen or air at low temperature) to form the corresponding "alkoxide" product which is then subjected to hydrolysis.

Illustrative organomagnesium reactants (lower 2-alkenyl magnesium compounds) are allylmagnesium chloride, allylmagnesium bromide, allylmagnesium iodide, bis-allylmagnesium, methallyl magnesium chloride, methallyl magnesium bromide, methallyl magnesium iodide, bis-methallyl magnesium, 2-butenyl magnesium chloride, 2-butenyl magnesium bromide, 2-butenyl magnesium iodide, bis-(2-butenyl)magnesium, 2-pentenyl magnesium chloride, 2-hexenyl magnesium bromide, 4-methyl-2-pentenyl magnesium bromide, cinnamyl magnesium bromide, and the like. The most preferred 2-alkenyl magnesium compounds are allylmagnesium chloride and allylmagnesium bromide.

As a general rule the 2-alkenyl Grignard reactants will be subjected to the above addition reactions in a reaction medium composed predominately of an ether whereas the bis-(2-alkenyl)-magnesium reactants are usually produced and used in a reaction medium composed predominately of a suitable paraffinic, cycloparaffinic or aromatic hydrocarbon, although ether reaction media are equally feasible. Exemplary reaction media and further details concerning the addition reaction and the oxidation and hydrolysis reactions are given in application Ser. No. 291,647, filed Sept. 25, 1972 (U.S. Pat. No. 3,810,949) and in the ensuing illustrative Examples.

EXAMPLE I

1:1 Reaction between allylmagnesium bromide and bicyclo-[2.2.1]hepta-2,5-diene followed by oxidation and hydrolysis Allylmagnesium bromide (50 mmoles) and bicyclo[2.2.1]hepta-2,5-diene (50 mmoles) were reacted in diethyl ether in a sealed bomb by heating for 2.25 hours at 125° C. and one hour at 140° C. The reaction product was then oxidized at 0° C. by passing gaseous oxygen through the product for about 30 minutes. The resultant product was then hydrolyzed with water followed by aqueous ammonium chloride solution and then water. After drying the product over anhydrous magnesium sulfate, the diethyl ether solvent was removed using a steam bath. The product was vacuum distilled and the fraction boiling at 95°–101° C. at 2.5–3 mm Hg was collected. This product, tricyclo[4.2.1.0$^{2,5}$]non-7-en-3-ylmethanol, was isolated in a 70 percent yield and its structure was supported by the results of nuclear magnetic resonance studies. It may be depicted as follows:

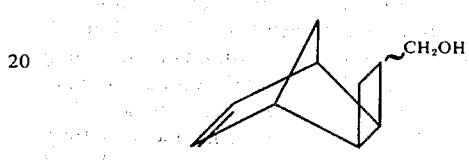

EXAMPLE II

1:1 Reaction between allylmagnesium bromide and bicyclo-[2.2.1]hepta-2,5-diene followed by oxidation and hydrolysis The procedure of Example I was repeated on a larger scale by reacting 195 mmoles of allylmagnesium bromide in diethyl ether with 218 mmoles of bicyclo[2.2.1]hepta-2,5-diene at 125° C. for 3 hours. After the oxidation and hydrolysis, distillation gave tricyclo[4.2.1.0$^{2,5}$]non-7-en-3-yl-methanol (b.p. 97°–99° C. at 1 mm Hg) in 73 percent yield based on the allylmagnesium bromide.

EXAMPLE III

1:1 Reaction between allylmagnesium bromide and bicyclo[2.2.1]hepta-2,5-diene followed by oxidation, hydrolysis and esterification A still larger quantity of tricyclo[4.2.1.0$^{2,5}$]non-7-en-3-yl methanol (i.e., 3-methyloltricyclo[4.2.1.0$^{2,5}$]non-7-ene) was prepared by oxidizing and hydrolyzing the product obtained by reaction of 260 mmoles of allylmagnesium bromide in diethyl ether with 304 mmoles of bicyclo[2.2.1]hepta-2,5-diene in a 300-milliliter bomb for 3 hours at 122° C. with occasional shaking. The hydrolysis was effected using dilute aqueous HCl followed by treatment with water, dilute aqueous sodium bicarbonate solution and then water. After drying the product, distillation gave the substituted methanol in 81 percent yield based on the allyl Grignard reagent employed. A portion of this product was converted to the acetate ester by treating it with a mixture of acetic anhydride, perchloric acid and ethyl acetate. This esterification yielded tricyclo[4.2.1.0$^{2,5}$]non-7-en-3-yl-methyl acetate. Analysis by vpc showed that this ester was composed of two major stereo-isomers in a ratio of approximately 5:1. Collectively the ester product can be represented by the formula:

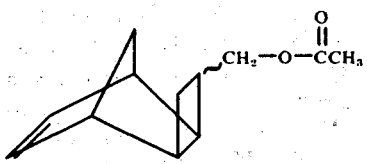

Naturally, if the bicyclo[2.2.1]hepta-2,5-diene subjected to the addition reaction has one or more lower alkyl or lower alkenyl substituents in the molecule (i.e., if the ring is substituted with alkyl and/or alkenyl groups, each of which (a) contains up to about 6 carbon atoms, (b) is inert under the reaction conditions and (c) does not adversely affect the addition reaction) the resultant tricyclo[4.2.1.0$^{2,5}$]non-7-ene produced on hydrolysis of the appropriate intermediate will not only possess in the 3 position a methylol substitutent but will possess alkyl and/or alkenyl substitution corresponding to the substitution in the initial bicycloheptadiene reactant. 1-Methyl-bicyclo-[2.2.1]hepta-2,5-diene, 1,4-dimethyl-bicyclo[2.2.1]hepta-2,5-diene, and 7-methyl-bicyclo[2.2.1]hepta-2,5-diene serve as examples of suitable substituted reactants of this type. Other inert substituents (i.e., substituents which do not take part in or prevent the desired addition reaction) may be present in the bicycloheptadiene reactant.

The preferred compounds of this invention are tricyclo-[4.2.1.0$^{2,5}$]non-7-enes wherein the 3 position is substituted by a methylol group, further substitution in the molecule, if any, being limited to lower alkyl substitution or lower alkenyl substitution, or both. As pointed out above and as illustrated by Example III, the methylol group may be esterified.

The compounds of this invention are useful as intermediates for the manufacture of lubricating oil, grease, and cutting oil additives. For example, they may be reacted with phosphorus pentasulfide in accordance with known technology to produce reaction products which are useful, inter alia, as antioxidants and extreme pressure additives when employed in small concentration in lubricating oils, greases, and cutting oils. Anyone wishing further details concerning the manufacture of such products or the manner of using them may refer to the comprehensive patent literature on the subject. U.S. Pat. No. 2,534,217 serves as but one typical reference showing how olefinic compounds may be reacted with phosphorus pentasulfide in order to produce suitable additives of this type. The patent also indicates the manner by which the products are used and the results which can be achieved through their use.

Likewise the compounds of this invention having a methylol group in the 3 position can be reacted with phosphorus trihalide such as PCl$_3$, preferably at a temperature of 0° to 10° C., to form tricyclic secondary phosphite esters which are useful as additives for synthetic lubricating oil, hydraulic oil, cutting oil and the like. These tricyclic secondary phosphite esters afford oils with better viscosity index, friction coefficient and superior resistance to oxidative deterioration as compared to the corresponding additive free products. A recent patent illustrating the techniques for carrying out reactions of this type is U.S. Pat. No. 3,751,528.

Since the compounds of this invention possess olefinic unsaturation they can be halogenated by standard techniques so as to add halogen atoms to the double bond and thereby form the corresponding dichloro, dibromo and iodochloro compounds. Simiarly, the olefinically double bonds in the compounds of this invention can be subjected to halohydrogenation with HCl or HBr, for example. Thus, the compounds of this invention may be used in gas scrubbing installations to purge free chlorine or HCl or the like from waste gas streams or the like in order to minimize atmospheric pollution by halogen or hydrogen halides. Similarly, the compounds of this invention can be hydrogenated in order to saturate the double bond.

In general, the compounds of this invention undergo many of the reactions of primary alcohols. Thus, the compounds of this invention may be used as intermediates for the manufacture of flotation chemicals, germicides, insecticides, fungicides, insect repellants, waterproofing agents, plasticizers, and emulsifying agents. In addition, the compounds of this invention are flammable and thus may be used as sources of heat, light, carbon dioxide and water. Still other uses for the compounds of this invention will become evident to those skilled in the art now that the art has been furnished these new chemical compounds.

It is to be understood and appreciated that although three dimensional molecular structures have been depicted in this description of the invention, it is not intended that the invention be limited to any given geometric or stereo isomer. The three dimensional formulas depicted herein have been utilized simply as a convenient way of representing the complex polycyclic compounds involved in the practice of this invention.

I claim:
1. Tricyclo[4.2.1.0$^{2,5}$]non-7-en-3-yl-methanol.

* * * * *